(12) United States Patent
Allen et al.

(10) Patent No.: US 7,673,114 B2
(45) Date of Patent: Mar. 2, 2010

(54) DYNAMICALLY IMPROVING MEMORY AFFINITY OF LOGICAL PARTITIONS

(75) Inventors: Kenneth Roger Allen, Rochester, MN (US); William Anton Brown, Pine Island, MN (US); Stuart Zachary Jacobs, Apple Valley, MN (US); Wade Bryon Ouren, Rochester, MN (US); Kenneth Charles Vossen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1077 days.

(21) Appl. No.: 11/335,812

(22) Filed: Jan. 19, 2006

(65) Prior Publication Data
US 2007/0168635 A1    Jul. 19, 2007

(51) Int. Cl.
*G06F 12/00*  (2006.01)
*G06F 13/00*  (2006.01)
*G06F 13/28*  (2006.01)

(52) U.S. Cl. .................................... 711/173
(58) Field of Classification Search ................. 711/173
See application file for complete search history.

(56) References Cited

U.S. PATENT DOCUMENTS

| | | | |
|---|---|---|---|
| 6,167,490 A * | 12/2000 | Levy et al. ................... 711/148 |
| 6,249,802 B1 * | 6/2001 | Richardson et al. .......... 709/200 |
| 6,336,177 B1 * | 1/2002 | Stevens ....................... 711/170 |
| 6,691,146 B1 * | 2/2004 | Armstrong et al. ........... 718/100 |
| 2002/0129115 A1 * | 9/2002 | Noordergraaf et al. ....... 709/213 |
| 2004/0019891 A1 * | 1/2004 | Koenen ....................... 718/102 |
| 2004/0088498 A1 * | 5/2004 | Accapadi et al. ............ 711/147 |
| 2004/0139287 A1 * | 7/2004 | Foster et al. ................. 711/153 |
| 2004/0221121 A1 * | 11/2004 | Hamilton et al. ............ 711/170 |
| 2005/0268064 A1 * | 12/2005 | Cohen et al. ................. 711/170 |
| 2007/0073992 A1 * | 3/2007 | Allen et al. .................. 711/170 |
| 2007/0073993 A1 * | 3/2007 | Allen et al. .................. 711/170 |
| 2007/0083728 A1 * | 4/2007 | Nijhawan et al. ............ 711/170 |

* cited by examiner

*Primary Examiner*—Sheng-Jen Tsai
(74) *Attorney, Agent, or Firm*—Martin & Associates, LLC; Derek P. Martin; James R. Nock (57) ABSTRACT

In a computer system that includes multiple nodes and multiple logical partitions, a dynamic partition manager computes current memory affinity and potential memory affinity at the request of a logical partition to help the logical partition determine whether a reallocation of resources between nodes may improve memory affinity for the logical partition. If so, the logical partition requests reallocation of resources by the dynamic partition manager so memory affinity for the logical partition is improved.

8 Claims, 8 Drawing Sheets

| Logical Partition ID | Processors | Memory (GB) |
|---|---|---|
| 1 | 8 | 8 |
| 2 | 4 | 4 |
| 3 | 2 | 2 |
| 4 | 2 | 2 |

LP1's Memory Affinity Score
(100 - |37.5 - 42.8|) * ((37.5 + 42.5)/2) = 37.88 (Node 0 affinity score) +
(100 - |25 - 28.5|) * ((25 + 28.5)/2) = 26.75 (Node 1 affinity score) +
0 (Node 2 affinity score) +
(100 - |25 - 28.5|) * ((25 + 28.5)/2) = 26.75 (Node 3 affinity score) =
91.38

FIG. 6

LP4's Memory Affinity Score
0 (Node 0 affinity score) +
0 (Node 1 affinity score) +
0 (Node 2 affinity score) +
(100 - |100 - 66|) * ((100 + 66)/2) = 55.61 (Node 3 affinity score) =
55.61

LP1's Memory Affinity Score
(100 - |37.5 - 42.8|) * ((37.5 + 42.5)/2) = 37.88 (Node 0 affinity score) +
(100 - |37.5 - 28.5|) * ((37.5 + 28.5)/2) = 30.33 (Node 1 affinity score) +
                                                            0 (Node 2 affinity score) +
(100 - |25 - 28.5|) * ((25 + 28.5)/2) =   26.75 (Node 3 affinity score) =
                                                            94.96

FIG. 10

LP4's Memory Affinity Score
                                                            0 (Node 0 affinity score) +
                                                            0 (Node 1 affinity score) +
(100 - |25 - 33|) * ((25 + 33)/2) = 26.68 (Node 2 affinity score) +
(100 - |75 - 66|) * ((75 + 66)/2) =  62.74 (Node 3 affinity score) =
                                                           89.42

DYNAMICALLY IMPROVING MEMORY AFFINITY OF LOGICAL PARTITIONS

BACKGROUND OF THE INVENTION

1. Technical Field

This invention generally relates to computer systems, and more specifically relates to computer systems that include multiple logical partitions on multiple nodes.

2. Background Art

The combination of hardware and software on a particular computer system defines a computing environment. Different hardware platforms and different operating systems thus provide different computing environments. In recent years, engineers have recognized that it is possible to provide different computing environments on the same physical computer system by logically partitioning the computer system resources to different computing environments. The series computer system developed by IBM is an example of a computer system that supports logical partitioning. If logical partitioning on an series computer system is desired, partition manager code (referred to as a "hypervisor" in IBM terminology) is installed that allows defining different computing environments on the same platform. Once the partition manager is installed, logical partitions may be created that define different computing environments. The partition manager manages the logical partitions to assure that they can share needed resources in the computer system while maintaining the separate computing environments defined by the logical partitions.

More recent developments in the field of logical partitioning support dynamic allocation of resources as logical partitions are running, and support defining logical partitions across multiple nodes in a computer system. The ability to dynamically allocate resources as logical partitions are running gives rise to issues relating to memory affinity in a logical partition. Memory affinity for a logical partition is defined herein to be the ratio of the logical partition's memory per node to the logical partition's processors per node. Memory affinity is important when logical partitions may span across nodes because an access by a processor in a logical partition in a node is much faster to memory on the same node than to memory on a different node. For this reason, we want to assure that each processor on a node has corresponding memory. If this is possible, perfect memory affinity may be achieved.

When logical partitions are first started, the partition manager typically creates the logical partitions with perfect memory affinity, meaning that each processor has a corresponding amount of memory on each node, or with similar memory affinity for all logical partitions if perfect memory affinity cannot be achieved. Note, however, that dynamic reallocation of resources may negatively impact the memory affinity of one or more logical partitions. As time goes on, it is possible for the memory affinity of a logical partition to degrade to the point of being a significant negative impact on performance of the logical partition. Without a way to dynamically adjust resource allocation to improve memory affinity in a logical partition, degradation in memory affinity due to dynamic allocation of resources may result in a logical partition that does not have the desired performance.

DISCLOSURE OF INVENTION

According to the preferred embodiments, in a computer system that includes multiple nodes and multiple logical partitions, a dynamic partition manager computes current memory affinity and potential memory affinity at the request of a logical partition to help the logical partition determine whether a reallocation of resources between nodes may improve memory affinity for the logical partition. If so, the logical partition requests reallocation of resources by the dynamic partition manager so memory affinity for the logical partition is improved.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The preferred embodiments evaluate current memory affinity for a logical partition, evaluate potential memory affinity based on a proposed reallocation of resources, and automatically initiate the proposed reallocation of resources if the potential memory affinity is greater than the current memory affinity for the logical partition. By dynamically tracking its memory affinity and making adjustments, the preferred embodiments avoid significant degradation of memory affinity that might result from dynamic reallocation of resources in multiple logical partitions.

Figure 1:
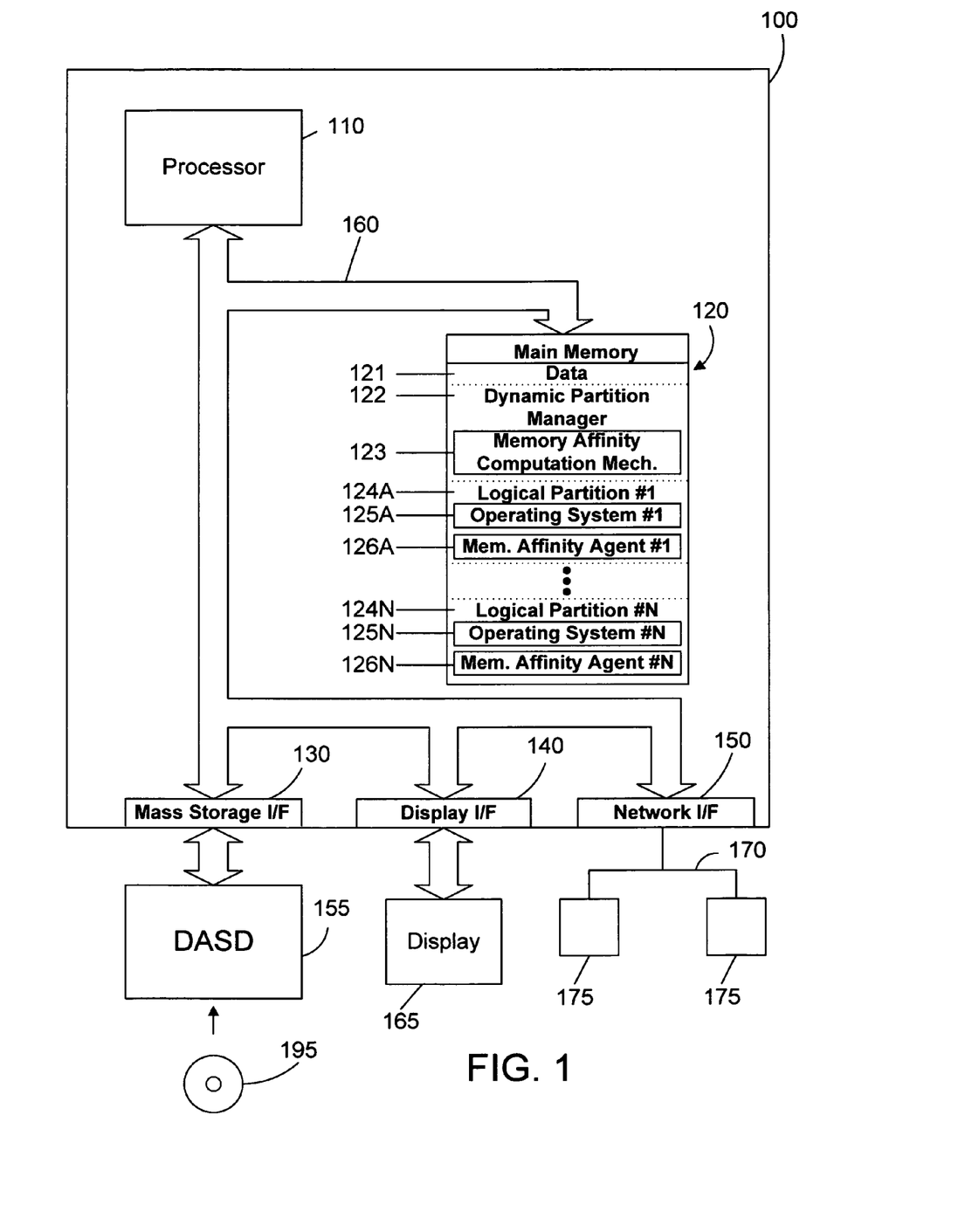
FIG. 1 is a block diagram of an apparatus in accordance with the preferred embodiments.

Referring to FIG. 1, a computer system 100 is one suitable implementation of an apparatus in accordance with the preferred embodiments of the invention. Computer system 100 is an IBM eServer series computer system. However, those skilled in the art will appreciate that the mechanisms and apparatus of the present invention apply equally to any computer system that is capable of being logically partitioned, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD-RW drive, which may store data to and read data from a CD-RW 195.

Main memory 120 in accordance with the preferred embodiments contains data 121, a dynamic partition manager 122, and multiple logical partitions 124, shown in FIG. 1 as 124A, . . . , 124N. Data 121 represents any data that serves as input to or output from any program in computer system 100. Dynamic partition manager 122 is a sophisticated program that contains low-level code to manage the resources of computer system 100. Some of these resources are processor 110, main memory 120, mass storage interface 130, display interface 140, network interface 150, and system bus 160. Dynamic partition manager 122 includes a memory affinity computation mechanism 123 that allows the dynamic partition manager 122 to compute a current memory affinity based on the current allocation of resources, and to compute a potential memory affinity based on a proposed reallocation of resources. Dynamic partition manager 122 preferably creates the N logical partitions 124. Each logical partition 124 preferably includes a corresponding operating system, shown in FIG. 1 as operating systems 125A through 125N, and a corresponding memory affinity agent, shown in FIG. 1 as memory affinity agents 126A through 126N.

The operating system in each logical partition is a multi-tasking operating system, such as i5/OS, AIX, or Linux; however, those skilled in the art will appreciate that the spirit and scope of the present invention is not limited to any one operating system. Any suitable operating system can be used. The operating system in each logical partition may be the same as the operating system in other logical partitions, or may be a completely different operating system. Thus, one logical partition can run the i5/OS operating system, while a different logical partition can run another instance of i5/OS, possibly a different release, or with different environment settings (e.g., time zone or language). The operating system in each logical partition could even be different than i5/OS, provided it is compatible with the hardware (such as AIX or Linux). In this manner the logical partitions can provide completely different computing environments on the same physical computer system.

The logical partitions 125A-125N are shown in FIG. 1 to reside within the main memory 120. However, one skilled in the art will recognize that a logical partition is a logical construct that includes resources other than memory. A logical partition typically specifies a portion of memory, along with an assignment of processor capacity and other system resources. Thus, one logical partition could be defined to include two processors and a portion of memory 120. Another logical partition could then be defined to include three other processors and a different portion of memory 120. The logical partitions are shown in FIG. 1 to symbolically represent logical partitions, which would include system resources outside of memory 120 within computer system 100. Note also that the dynamic partition manager 122 preferably resides in memory and hardware separate from the logical partitions and includes facilities and mechanisms that are not directly available to the logical partitions.

Each logical partition includes a corresponding memory affinity agent, shown in FIG. 1 as memory affinity agents 126A, . . . , 126N. The memory affinity agent in each logical partition may request the dynamic partition manager 122 use its memory affinity computation mechanism 123 to determine current memory affinity based on a current allocation of resources, and to determine potential memory affinity based on a proposed reallocation of resources. If the potential memory affinity is greater than the current memory affinity, the logical partition may request the dynamic partition manager 122 to provide the proposed reallocation of resources. In this way, a logical partition may dynamically monitor its memory affinity, and may dynamically make adjustments in resource allocation to improve its memory affinity.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, dynamic partition manager 122, and logical partitions 124A, . . . , 124N are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up dynamic partition manager 122.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiments each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD RW (e.g., 195 of FIG. 1), and transmission type media such as digital and analog communications links. Note that the preferred signal bearing media is tangible.

Figure 2:
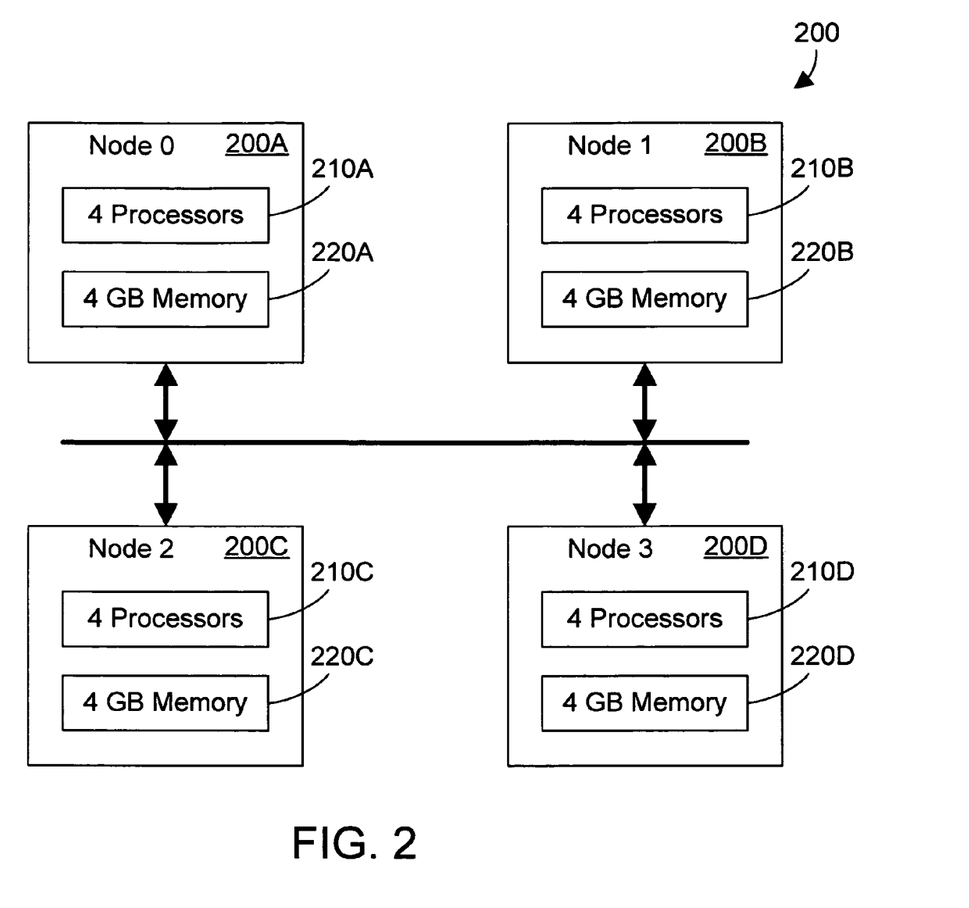
FIG. 2 is a block diagram of a sample computer system before logical partitioning.

Referring to FIG. 2, a sample computer system 200 is shown that includes four nodes 200A, 200B, 200C and 200D. Each node includes four processors and four gigabytes of memory. Thus, node 200A includes four processors 210A and four GB of memory 220A; node 200B includes four processors 210B and four GB of memory 220B; node 200C includes four processors 210C and four GB of memory 220C; and node 200D includes four processors 210D and four GB of memory 220D.

Figure 3:
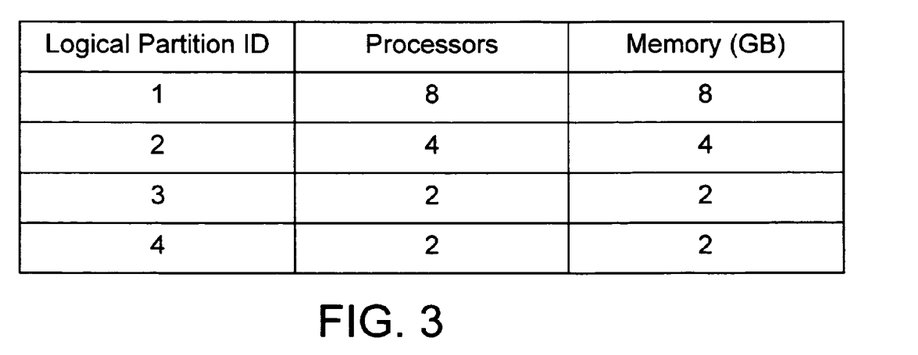
FIG. 3 is a table showing a sample allocation of resources shown in FIG. 2 to four different logical partitions.

We now assume that the hardware shown in FIG. 2 needs to be allocated to logical partitions according to the table 300 in FIG. 3. Logical partition 1 (LP1) is defined to include eight processors and eight GB memory; LP2 is defined to include four processors and four GB memory; LP3 is defined to include two processors and two GB memory; and LP4 is defined to include two processors and two GB memory.

We assume one of the nodes in FIG. 2 includes the dynamic partition manager 122 shown in FIG. 1, which initializes the logical partitions when the computer system 200 is first powered up. We assume for the purpose of this example that the dynamic partition manager in one of the nodes configures the logical partitions as shown in computer system 400 in FIG. 4. Note that the four processors in each node are assigned to one of the logical partitions, and the 4 GB of memory in each node is also divided up and allocated to the logical partitions. Note that memory is typically allocated to a logical partition in a block referred to herein as a logical memory block. Prior art partition managers allow the system administrator to specify the size of each logical memory block. For this example, we assume a logical memory block size of 256 MB, which means it takes four logical memory blocks to equal a gigabyte of memory. The memory chunks shown in FIG. 4 are one gigabyte blocks for the sake of convenience in the figure, which means each memory block in FIG. 4 includes four logical memory blocks.

Referring again to FIG. 4, three of the four processors on node 200A, namely processors 412A, 414A and 416A are allocated to LP1. In similar fashion, memory blocks 422A, 424A and 426A are allocated to LP1. The fourth processor 418A is allocated to LP2, as is the fourth memory block 428A. On node 200B, two of the processors, namely processors 412B and 414B, are allocated to LP1; one of the processors 416B is allocated to LP2; and one of the processors 418B is allocated to LP3. In similar fashion, memory blocks 422B and 424B are allocated to LP1; memory block 426B is allocated to LP2; and memory block 428B is allocated to LP3.

On node 200C, one processor 412C is allocated to LP1; two processors 414C and 416C are allocated to LP2; and one processor 418C is allocated to LP3. In similar fashion, memory block 422C is allocated to LP1; memory blocks 424C and 426B are allocated to LP2; and memory block 428C is allocated to LP3. On node 200D, two processors 412D and 414D are allocated to LP1; and two processors 416D and 418D are allocated to LP4. In similar fashion, memory blocks 422D and 424D are allocated to LP1; and memory blocks 426D and 428D are allocated to LP4.

Figure 4:
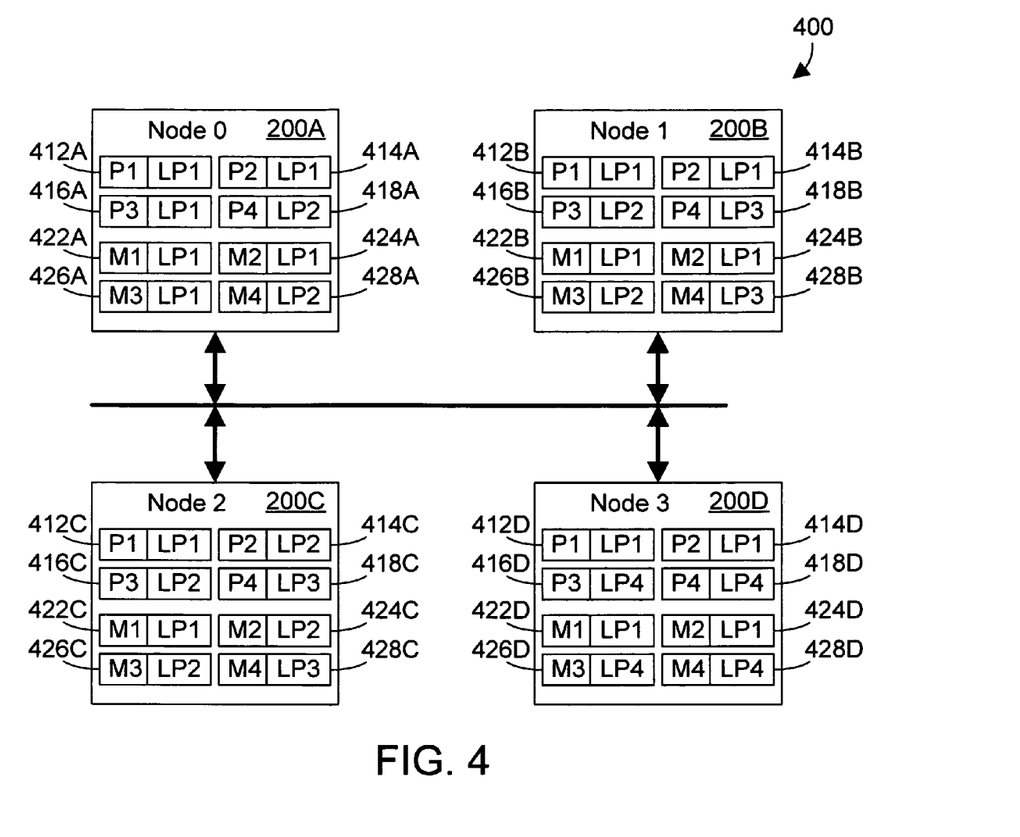
FIG. 4 is a block diagram showing one suitable sample configuration of the computer system in FIG. 2 after logical partitioning as shown in FIG. 3.

Because memory affinity of a logical partition is the ratio of the logical partition's memory per node to the logical partition's processors per node, we see from the allocation shown in FIG. 4 that each logical partition has perfect (i.e., 100%) memory affinity, because for each processor on each node for any logical partition, there is a corresponding 1 GB block of memory on that same node. Note that the configuration of computer system 400 shown in FIG. 4 is assumed to be the state of the processor and memory allocations at a particular point in time, such as just after initial program load (IPL).

Figure 5:
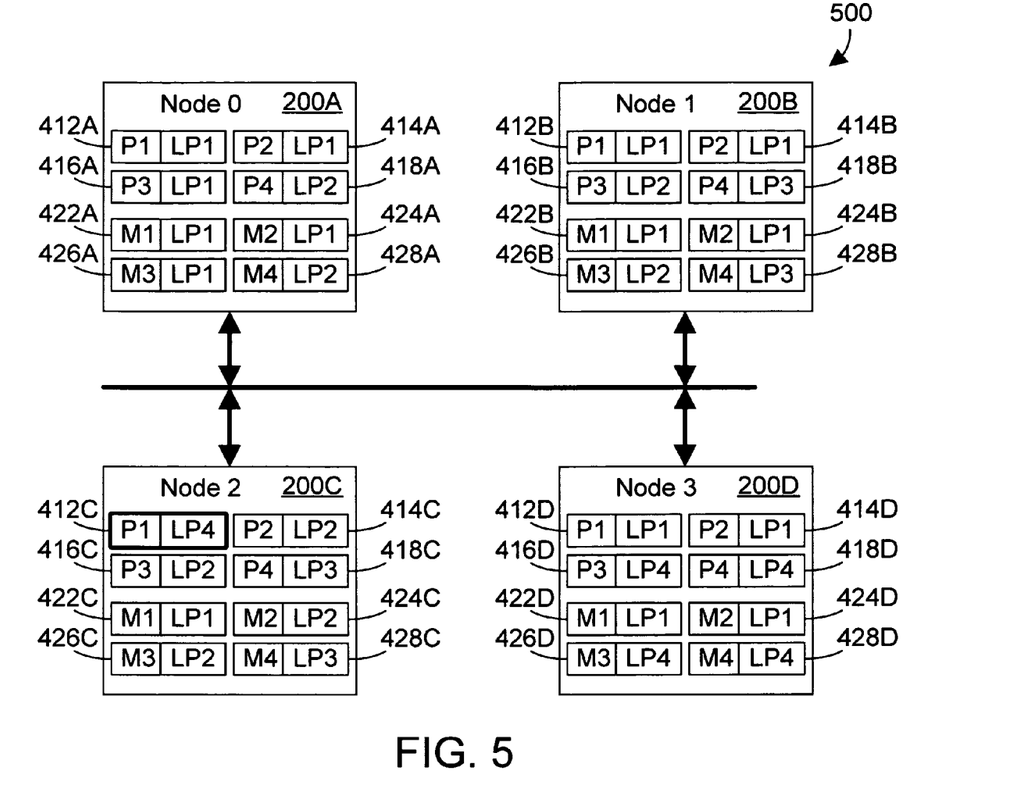
FIG. 5 is a block diagram showing the computer system in FIG. 4 after reallocation of resources that results in less than perfect memory affinity for two of the logical partitions.

Because the computer system 400 includes a dynamic partition manager 122 as shown in FIG. 1 on one of the nodes, it is possible for the allocation of memory and processors in computer system 400 to change over time, thereby negatively impacting memory affinity for one or more of the logical partitions. This is the case with the configuration of computer system 500 shown in FIG. 5, which shows that processor 412C in node 200C has been reallocated to LP4 instead of LP1, as shown by the bold box around 412C. None of the other processor or memory allocations in FIG. 5 changed, and are the same as shown in FIG. 4. As a result, there is a mismatch between processors and memory in LP1 and LP4, causing a reduction in the memory affinity in LP1 and LP4 due to the reallocation shown in FIG. 5.

The dynamic partition manager 122 includes a memory affinity computation mechanism 123 that computes memory affinity for a logical partition using the following equation:

$$\text{memory affinity} = \sum_{1}^{n} (100 - |PMn - PCn|) * PRn$$

where
n=the number of nodes used by the selected logical partition
PMn=the percent of the selected logical partition's memory on the node
PCn=the percent of the selected logical partition's processors on the node
PRn=the percent of the selected logical partition's total resources on the node, which equals (PMn+Pcn)/2.

Figure 6:
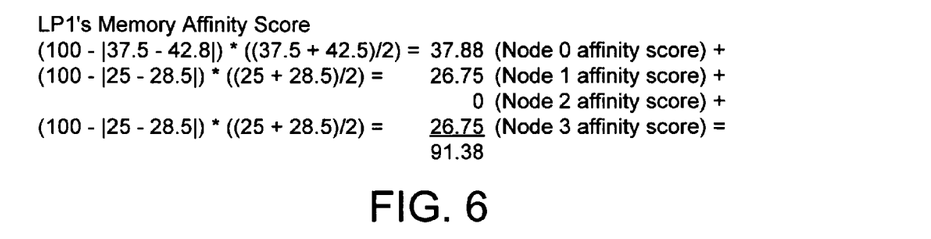
FIG. 6 shows an equation for computing the current memory affinity score for LP1 based on the configuration shown in FIG. 5.
Figure 7:
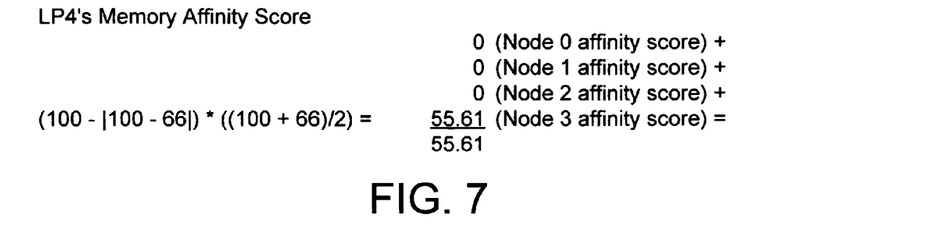
FIG. 7 shows an equation for computing the current memory affinity score for LP4 based on the configuration shown in FIG. 5.

This equation is used to return a number between 0 and 100 that indicates the percentage, or score, of memory affinity for a logical partition. Now using this equation, LP1's memory affinity score may be computed as shown in FIG. 6. Note that the affinity score for a node is defined to be zero if the node has no processors allocated to the logical partition of interest, or if a node has one or more processors but no memory allocated to the logical partition of interest. Thus, because none of the processors on node 2 (200C) are allocated to LP1, the node 2 affinity score for LP1 is zero, as shown in FIG. 6. The memory affinity is the sum of the computations for each node, resulting in an overall memory affinity score of 91.38 for LP1 based on the allocation shown in FIG. 5. We now use the same equation to compute the memory affinity score for LP4 as shown in FIG. 7, resulting in an overall memory affinity score of 55.61 for LP4. Although the memory affinity score for LP1 and LP4 is less than 100, there is nothing either of these logical partitions can do to increase their memory affinity because all of the processors and memory blocks have been allocated. As a result, no changes can be made until resources become available that could be allocated to LP1 or LP4.

Figure 8:
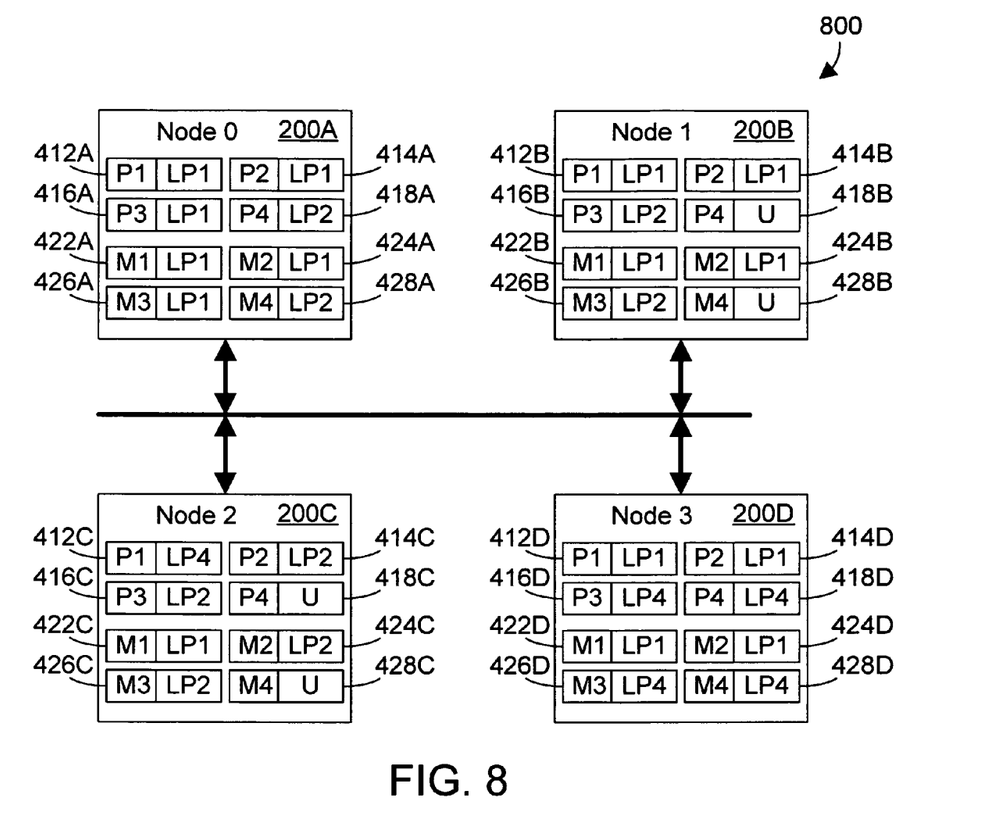
FIG. 8 shows the computer system in FIG. 5 after LP3 is removed.

We now assume LP3 is removed, resulting in the processors and memory for LP3 being freed up and available for allocation to one of the three remaining logical partitions. This is shown in computer system 800 in FIG. 8 by processor 418B and memory 428B in node 200B being marked "U", which stands for "unallocated"; and by processor 418C and memory 428B in node 200C being marked "U". Now that there are resources available, a logical partition can determine whether allocating one or more of the resources to the logical partition will increase the memory affinity of the logical partition.

Figure 9:
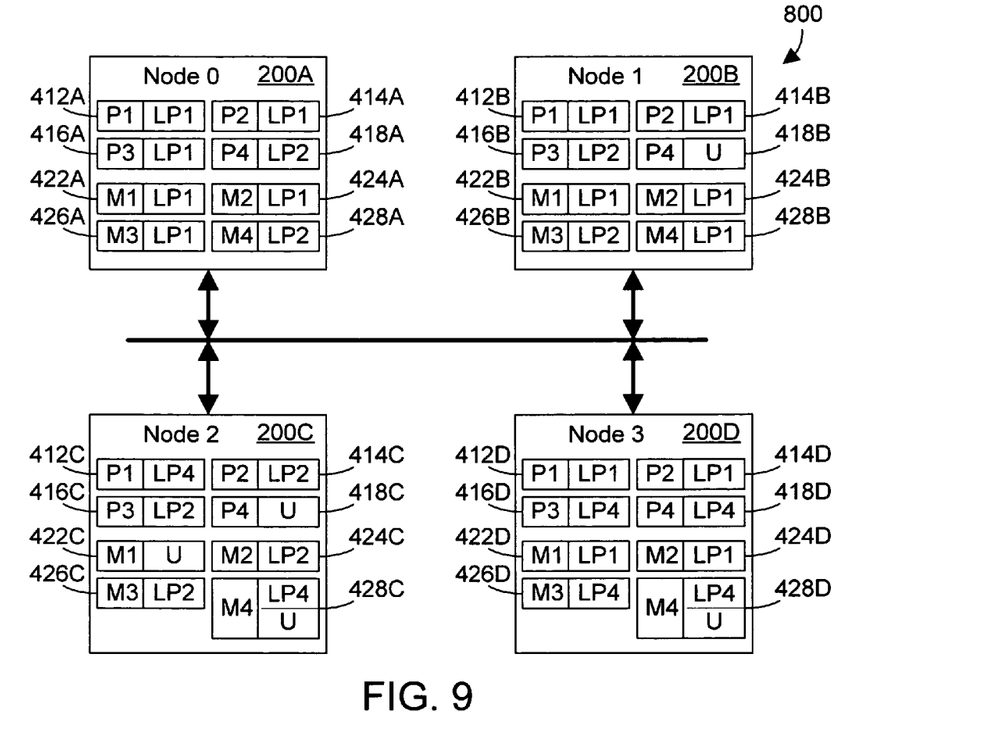
FIG. 9 shows a proposed reallocation of resources in the computer system in FIG. 8 in an attempt to improve memory affinity of LP1 and LP4.

At this point, LP1 could recognize that it could improve its memory affinity by swapping the memory block 422C allocated to LP1 on node 2 (200C) with the unallocated memory block 418B on node 1 (200B). LP4 could also improve its memory affinity by exchanging some of its memory from memory block 428D on node 3 (200D) for some of the unassigned memory block 428D on node 2 (200C). Thus, one possible proposed reallocation of resources is shown in computer system 900 in FIG. 9. Note this proposed reallocation only allocated half of the 1 GB block 428C to LP4, while the other half is unallocated. Likewise for node 200D, where half of the 1 GB block 428D is allocated to LP4, while the other half is unallocated. This split allocation is possible because each 1 GB block of memory shown in FIG. 9 is made up of four 256 MB logical memory blocks. This allows two of the four logical memory blocks in the 1 GB block 428C to be allocated to LP4, while the remaining two logical memory blocks in the 1 GB block 428C are unallocated. Likewise for block 428D in node 200D. Using the same equation above, we can now compute the memory affinity score of LP1 and LP4 for the proposed reallocation of resources to see if reallocating the resources improves memory affinity.

Figure 10:
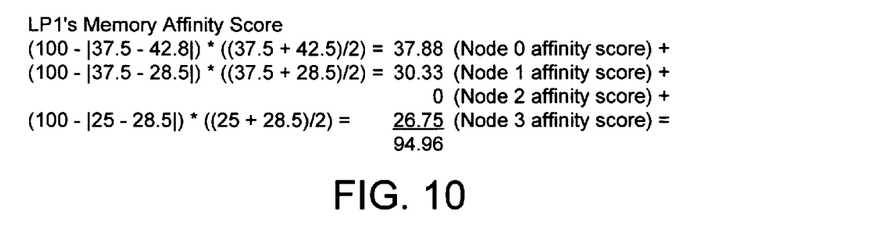
FIG. 10 shows an equation for computing the potential memory affinity score for LP1 based on the proposed reallocation of resources shown in FIG. 9.
Figure 11:
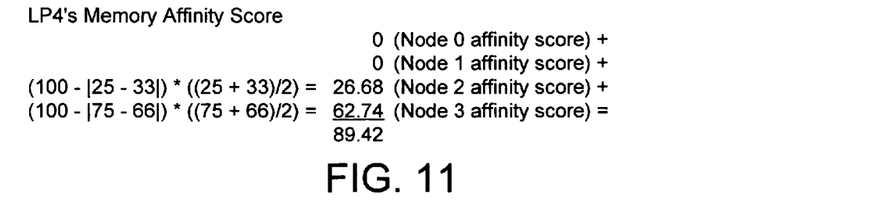
FIG. 11 shows an equation for computing the potential memory affinity score for LP4 based on the proposed reallocation of resources shown in FIG. 9.

LP1's memory affinity score for the proposed reallocation of resources shown in FIG. 9 is shown in FIG. 10, resulting in an overall memory affinity score of 94.96 for LP1. LP4's memory affinity score for the proposed reallocation of resources shown in FIG. 9 is shown in FIG. 1, resulting in an overall memory affinity score of 89.42 for LP4. We see that 94.96 for LP1 in FIG. 10 for the proposed reallocation of resources in FIG. 9 is higher than the 91.38 for the current allocation of resources shown in FIG. 6, so LP1 could request that the dynamic partition manager perform the reallocation of resources for LP1 shown in FIG. 9. Likewise, we see that 89.42 for LP4 in FIG. 11 for the proposed reallocation of resources in FIG. 9 is higher than the 55.61 for the current allocation of resources shown in FIG. 7, so LP2 could request that the dynamic partition manager perform the reallocation of resources for LP4 shown in FIG. 9.

Figure 12:
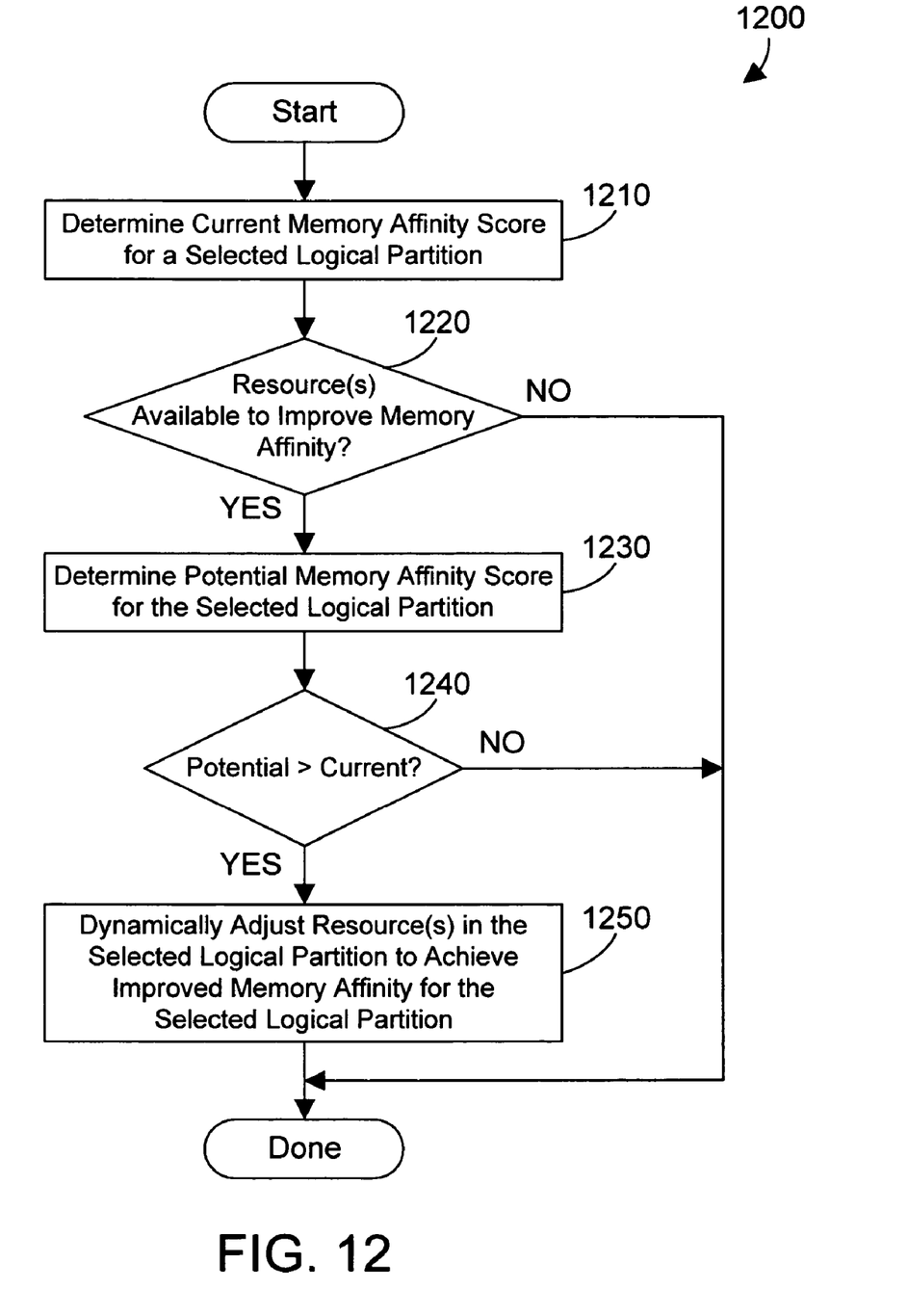
FIG. 12 is a flow diagram of a first method in accordance with the preferred embodiments.

Referring to FIG. 12, a first method 1200 in accordance with the preferred embodiments shows the steps for dynamically reallocating resources to improve memory affinity in a logical partition. Method 1200 begins by determining a current memory affinity score for a selected logical partition (step 1210). If there are no resources available to improve the memory affinity of the selected logical partition (step 1220=NO), method 1200 is done. If there are one or more resources that could improve memory affinity of the selected logical partition (step 1220=YES), the potential memory affinity score for the selected logical partition is determined (step 1230). The current memory affinity score determined in step 1210 is then compared in step 1240 to the potential memory affinity score determined in step 1230. If the potential memory affinity score for the selected logical partition is not greater than the current memory affinity score (step 1240=NO), method 1200 is done. If the potential memory affinity score for the selected logical partition is greater than the current memory affinity score (step 1240=YES), the resources in the selected logical partition are dynamically adjusted to achieve improved memory affinity for the selected logical partition (step 1250). Note that the adjustment of resources in step 1250 may include any suitable addition of one or more resources or removal of one or more resources from the selected logical partition.

Figure 13:
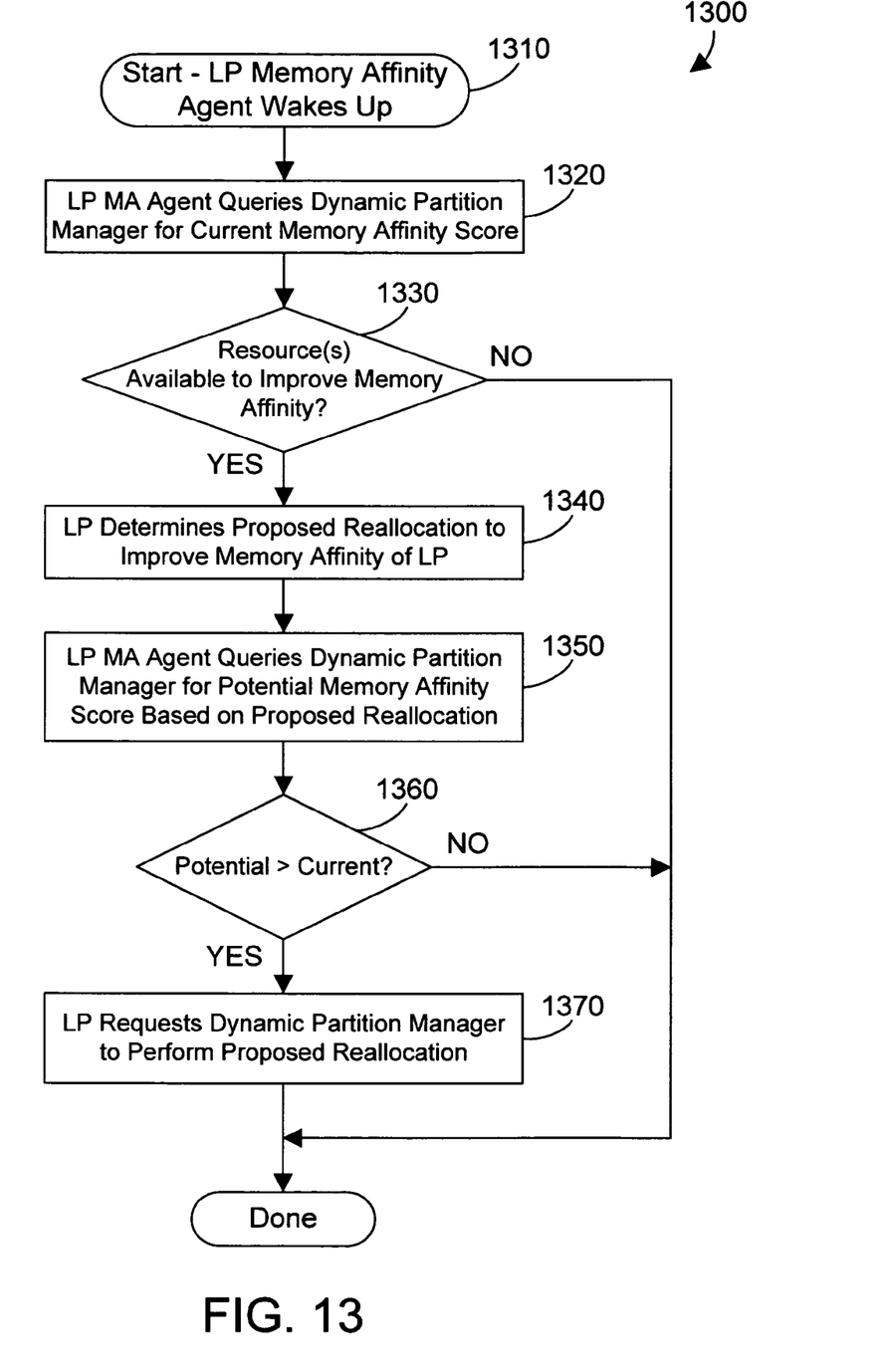
FIG. 13 is a flow diagram of a second method in accordance with the preferred embodiments.

Referring to FIG. 13, a second method 1300 in accordance with the preferred embodiments shows the steps performed in a more specific example, where each logical partition includes a memory affinity agent (e.g., 126A in FIG. 1) that requests computations of memory affinity scores by the memory affinity computation mechanism 123. We assume for this example that the memory affinity agent in a logical partition wakes up every so often, say five minutes, to check to see if its memory affinity can be improved. Thus, method 1300 in FIG. 13 begins when the memory affinity agent in a selected logical partition wakes up (step 1310). The memory affinity agent (referred to in FIG. 13 as MA Agent) for a logical partition (referred to in FIG. 13 as LP) queries the dynamic partition manager to compute the current memory affinity score for the selected logical partition (step 1320). If there are no resources available to improve the memory affinity of the selected logical partition (step 1330=NO), method 1300 is done. If there is one or more resource available that could improve the memory affinity of a logical partition (step 1330=YES), the selected logical partition determines a proposed reallocation of resources in an attempt to improve the memory affinity of the logical partition (step 1340). The memory affinity agent in the selected logical partition queries the dynamic partition manager for a potential memory affinity score based on the proposed reallocation that was determined in step 1340 (step 1350). If the potential memory affinity score is not greater than the current memory affinity score (step 1360=NO), method 1300 is done. If the potential memory affinity score is greater than the current memory affinity score (step 1360=YES), the logical partition then requests the dynamic partition manager to perform the proposed reallocation of resources (step 1370). Note that the term "reallocation of resources" is used broadly to mean any change in resource allocation to the selected logical partition. For example, let's assume that an unallocated memory block is available after initial program load, and the selected logical partition discovers it may improve its memory affinity by having the unallocated memory block allocated to itself. The allocation of this unallocated block of memory to the selected logical partition is a "reallocation" in the sense that the total resources in the selected logical partition change, not because the memory block being allocated to the logical partition was previously allocated to a different logical partition.

Note that the preferred embodiments discussed above assume the logical partitions ultimately have control over the reallocation of resources. This is an important feature because it gives each logical partition the ability to determine if and when to request reallocation of resources to improve memory affinity. In an alternative embodiment, the dynamic partition manager could monitor the memory affinity of all logical partitions, determine a proposed reallocation of resources, and determine whether the proposed reallocation of resources produces a net increase in memory affinity in one or more logical partitions. This approach also allows the dynamic partition manager to make tradeoffs. For example, the dynamic partition manager could determine that a proposed reallocation of resources increases memory affinity for one logical partition by 30 while reducing the memory affinity for a different logical partition by 3. The dynamic partition manager could then determine to perform the propose reallocation even though it produces a slight reduction in memory affinity due to the great gain in memory affinity in the other logical partition. Note that the partition manager could also rank the logical partitions, and not perform the proposed reallocation of resources if the logical partition that would have its memory affinity reduced by 3 is a higher rank than the logical partition that would have its memory affinity increased by 30. Of course, other suitable criteria or heuristics could also be used. The preferred embodiments expressly extend to any mechanism or method for dynamically reallocating one or more resources on a multi-node computer system that includes multiple logical partitions to improve memory affinity of one or more of the logical partitions.

The preferred embodiments provide a way for a logical partition to monitor its memory affinity over time. When a change in the allocation of resources reduces its memory affinity, the logical partition determines a proposed reallocation of resources that is expected to improve the memory affinity. The current memory affinity score for the current allocation of resources is then compared to the potential memory affinity score for the proposed allocation of resources. If the potential memory affinity score is greater than the current memory affinity score, the logical partition may initiate a reallocation of resources to improve the memory affinity of the logical partition. By dynamically tracking memory affinity and adjusting allocation of resources to improve memory affinity over time, a computer system that evolves over time will still be able to provide good memory affinity as resources are dynamically reallocated on a computer system that includes multiple logical partitions on multiple nodes.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, while the preferred embodiments discussed above perform dynamic reallocation of resources if the potential memory affinity score is greater than the current memory affinity score, the preferred embodiments expressly include any suitable heuristic or relationship between the potential memory affinity score and the current memory affinity score. For example, the decision to perform the proposed reallocation of resources might be performed only if the potential memory affinity score exceeds the current memory affinity score by some amount, such as 10. One skilled in the art will realize that any suitable criteria or heuristic for determining when to reallocate resources to improve memory affinity of a logical partition are within the scope of the preferred embodiments.

What is claimed is:

1. A computer system comprising:
a plurality of logical partitions defined on a plurality of nodes, each logical partition comprising a plurality of resources on at least two of the plurality of nodes;
a dynamic partition manager that manages allocation of the plurality of resources on the plurality of nodes to the plurality of logical partitions, the dynamic partition manager comprising a memory affinity computation mechanism that computes memory affinity for a selected logical partition; and
a memory affinity agent in the selected logical partition, the memory affinity agent determining from the memory affinity computation mechanism a current memory affinity for the selected logical partition based on a current allocation of resources in the selected logical partition, the memory affinity agent determining from the memory affinity computation mechanism a potential memory affinity for the selected logical partition based on a proposed reallocation of resources in the selected logical partition,
wherein the memory affinity computation mechanism computes memory affinity for a selected logical partition using the equation $$\text{memory affinity} = \sum_{1}^{n}(100 - |PMn - PCn|) * PRn$$

where
n=the number of nodes used by the selected logical partition
PMn=percent of memory corresponding to the selected logical partition on a selected node
PCn=percent of processors corresponding to the selected logical partition on the selected node
PRn=percent of total resources corresponding to the selected logical partition on the selected node, which equals (PMn+PCn)/2.

2. The computer system of claim 1 wherein the memory affinity for the selected node is defined to be zero if either PMn is zero or PCn is zero.

3. A computer-implemented method for dynamically improving memory affinity of a selected logical partition in a computer system that comprises a plurality of logical partitions on a plurality of nodes, each logical partition comprising a plurality of resources on at least two of the plurality of nodes, the method comprising the steps of:
(A) determining current memory affinity for the selected logical partition based on a current allocation of resources in the logical partition;
(B) determining whether at least one resource is available to improve the current memory affinity;
(C) if at least one resource is available to improve the current memory affinity, performing the steps of:
(C1) determining potential memory affinity for the selected logical partition based on a proposed reallocation of resources in the selected logical partition; and
(C2) if the potential memory affinity determined in step (C1) is greater than the current memory affinity determined in step (A), dynamically adjusting at least one resource in the selected logical partition,
wherein step (A) determines the current memory affinity for a selected logical partition using the equation $$\text{memory affinity} = \sum_{1}^{n}(100 - |PMn - PCn|) * PRn$$

where
n=the number of nodes used by the selected logical partition

PMn=Percent of memory corresponding to the selected logical partition on a selected node PCn=percent of processors corresponding to the selected logical partition on the selected node PRn=percent of total resources corresponding to the selected logical partition on the selected node, which equals (PMn+PCn)/2.

4. The method of claim 3, wherein the current memory affinity for the selected node is defined to be zero if either PMn is zero or PCn is zero.

5. The method of claim 3 wherein step (C1) determines the potential memory affinity for a selected logical partition using the equation $$\text{memory affinity} = \sum_{1}^{n}(100-|PMn-PCn|)*PRn$$

where n=the number of nodes used by the selected logical partition based on the proposed reallocation of resources PMn=percent of memory corresponding to the selected logical partition on a selected node based on the proposed reallocation of resources PCn=percent of processors corresponding to the selected logical partition on the selected node based on the proposed reallocation of resources PRn=percent of total resources corresponding to the selected logical partition on the selected node based on the proposed reallocation of resources, which equals (PMn+PCn)/2.

6. The method of claim 5 wherein the potential memory affinity for the selected node is defined to be zero if either PMn is zero or PCn is zero.

7. A computer-readable program product including recordable media, the program product comprising:

(A) a dynamic partition manager that manages allocation of a plurality of resources on a plurality of nodes to a plurality of logical partitions, each logical partition comprising a plurality of resources on at least two of the plurality of nodes, the dynamic partition manager comprising a memory affinity computation mechanism that computes memory affinity for a selected logical partition; and (B) a memory affinity agent in the selected logical partition, the memory affinity agent determining from the memory affinity computation mechanism a current memory affinity for the selected logical partition based on a current allocation of resources in the selected logical partition, the memory affinity agent determining from the memory affinity computation mechanism a potential memory affinity for the selected logical partition based on a proposed reallocation of resources in the selected logical partition, wherein the memory affinity computation mechanism computes memory affinity for a selected logical partition using the equation $$\text{memory affinity} = \sum_{1}^{n}(100-|PMn-PCn|)*PRn$$

where n=the number of nodes used by the selected logical partition

PMn=percent of memory corresponding to the selected logical partition on a selected node PCn=percent of processors corresponding to the selected logical partition on the selected node PRn=percent of total resources corresponding to the selected logical partition on the selected node, which equals (PMn+PCn)/2.

8. The program product of claim 7 wherein the memory affinity for the selected node is defined to be zero if either PMn is zero or PCn is zero.

* * * * *